United States Patent Office 3,102,869
Patented Sept. 3, 1963

3,102,869
DYEABLE POLY-α-OLEFIN FIBERS CONTAINING POLYVINYL ACETAL RESINS
Harry W. Coover, Jr., and Frederick B. Joyner, Kingsport, Tenn., assignors to Eastman Kodak Company, Rochester, N.Y., a corporation of New Jersey
No Drawing. Filed Aug. 11, 1960, Ser. No. 48,804
20 Claims. (Cl. 260—45.5)

This invention relates to poly-α-olefin fibers. More particularly, this invention relates to substantially crystalline poly-α-olefin fibers which exhibit excellent dye affinity and fastness properties as well as good resistance to oxidation and weathering. In a more specific aspect, this invention relates to poly-α-olefin fibers which are modified with polyvinyl acetal resins.

It is well known that poly-α-olefins, particularly the poly-α-olefins which are partially or completely crystalline, can be spun into synthetic fibers having unusual physical properties. These polymers are, however, subject to inherent disabilities which greatly restrict their utility in the fabrication of general purpose fibers. For example, high-molecular-weight, fiber-forming, crystalline poly-α-olefins which are derived from an α-olefin containing 5–11 carbon atoms are relatively insoluble, chemically inert, hydrophobic materials. Since they are not readily permeable to water, they cannot be dyed satisfactorily by the ordinary dyeing procedures. Since they are relatively inert chemically, they cannot be permanently dyed even with hydrocarbon soluble dyestuffs. Furthermore, these substantially crystalline poly-α-olefin yarns and fibers cannot be dyed readily with a wide variety of dispersed, premetallized and acid-type dyes, nor can such yarns and fibers be dyed to deep shades have good light and gas fastness. Moreover, the susceptibility of these poly-α-olefin fibers to oxidative degradation, instability toward ultraviolet light and poor weathering characteristics have further limited their utility. Hence, it is most desirable to obtain fibers free from the above-mentioned disabilities in order to increase their value in the textile field.

The problem of obtaining poly-α-olefin fibers having the high tenacity and other excellent properties characteristic of such fibers without the accompanying undesirable limitations described above, has plagued prior art workers in this field for many years. However, with the development of the instant invention, we have been able to furnish such a poly-α-olefin fiber.

Accordingly, it is an object of this invention to provide poly-α-olefin fibers having improved dye affinity.

Another object of this invention is to provide poly-α-olefin yarns and fibers with greatly improved dyeing characteristics so that they can be dyed readily with a wide variety of dispersed and premetallized dyes which normally will not dye unmodified poly-α-olefins.

Another object is to provide partially or completely crystalline poly-α-olefin yarns and fibers which can be dyed to deep shades with excellent light and gas fastness.

Still another object of this invention is to provide poly-α-olefin yarns and fibers having greatly improved resistance to oxidation and weathering in addition to excellent physical properties.

Further objects of this invention will become apparent from an examination of the following description and claims.

In accordance with this invention, it has been found that polymeric blends containing polymers of certain specific α-olefins containing 5–11 carbon atoms and an effective concentration of about 1 to about 25% and more preferably about 5 to about 15%, by weight, based on the blend, of one or more of the polyvinyl acetal resins, as hereinafter described, can be spun into high strength fibers and yarns having the same percentage composition which exhibit excellent dye affinity for dispersed, premetallized and acid-type dyes. The dyed materials obtained thereby exhibit excellent light and gas fastness and unexpectedly good oxidative stability.

This discovery is extremely significant since we are able to combine the desirable high softening point which is characteristic of polymers of α-olefins containing 5–11 carbon atoms with excellent dye affinity. The softening point of the polymer is, of course, significant with respect to ironing temperatures and other applications, e.g. use in tire cord, which require resistance to heat. For example, polypropylene, which exhibits many desirable characteristics as a fiber has a softening point of only about 170–175° C. which limits its use in fabrics and tire cord. In contrast, the poly-α-olefins of this invention have softening points in excess of 200° C. which make them eminently suited for use in fabrics and tire cord.

Although unmodified polymers of α-olefins containing 5–11 carbon atoms show virtually no affinity for dyestuffs, they can be dyed with some dyes to weak shades having, however, very poor fastness properties, as mentioned hereinbefore. Surprisingly, it has been found that the shades produced by a given dye on the unmodified poly-α-olefin yarn and on the modifiers themselves were quite different from the shades produced by the same dye on the modified poly-α-olefin yarns of this invention. This unpredictable result indicates that the fibers spun from the polymeric blends described above possess characteristics which ordinarily would not have been expected in fibers spun from simple mixtures of polymeric materials. In this connection, it was also discovered that the modified fibers described herein are more resistant to oxidative degradation than fibers obtained from the same unmodified poly-α-olefins.

The modified poly-α-olefin fibers of this invention are also more stable toward ultraviolet light and weathering conditions than the same unmodified fibers. The reason for the increased stability of the modified fibers toward oxidation, light and weathering is not completely understood. It is possible, however, that free radicals generated from the polymeric modifiers combine with free radicals produced from the poly-α-olefin to prevent chain reactions which would otherwise result in rapid deterioration of the poly-α-olefin. It is possible that the polymeric modifiers may also be effective in absorbing actinic radiant energy which otherwise could activate a free-radical mechanism of decomposition in the poly-α-olefin.

The modified poly-α-olefin fibers and yarns of this invention can be further stabilized against thermal breakdown and weathering with any of the conventional stabilizers for polyolefins. It is usually convenient to add such stabilizers to the polymeric blends before spinning into fibers.

Our modified poly-α-olefin fibers and yarns can be drawn to give the same high tenacities, high softening points and other excellent properties found in the corresponding unmodified fibers and yarn. This is quite surprising, since the polyvinyl acetal resins are substantially noncrystalline when prepared by conventional methods and, as a result, give fibers which possess low tenacities, high shrinkage properties, and no commercial value. It would have been predicted, contrary to fact, that these materials, when used to modify poly-α-olefins for fibers and yarn, would have deleteriously affected the properties of the yarn.

The polyvinyl acetal resins employed in this invention are well known materials, typically derived by conventional methods from polyvinyl acetates by hydrolysis of the latter material, followed by reaction with an aldehyde. As is explained by Schildknecht in "Vinyl and Related Polymers," published by John Wiley and Sons, Inc., New York, New York, in 1952, at page 358, high-polymer chemists use the term "polyvinyl acetal" to indicate polyvinyl alcohols which have had a major part of their hydroxyl groups condensed with aldehydes. One mole of the aldehyde condenses with two hydroxyls to yield the acetal. The remaining hydroxyl groups may be free or they may be acylated.

Any polyvinyl acetal resin can be used in the practice of our invention although it is desirable that the material be a polyvinyl acetal resin of an aldehyde containing 1 to 18 carbon atoms. Also, it is preferred that the resin contain from about 50 to about 100 mole percent or more preferably about 80 to about 100 mole percent, of vinyl acetal groups derived from the aforementioned aldehydes or mixtures thereof; the balance of the polyvinyl alcohol hydroxyls being free or acylated. The resins employed herein have molecular weights of at least 1,000 and include, for example; polyvinyl acetaldehyde acetal, polyvinyl n-valeraldehyde acetal, polyvinyl formaldehyde acetal, polyvinyl butyraldehyde acetal, polyvinyl heptaldehyde acetal and the like.

Various aldehydes can be employed in the formation of the polyvinyl acetal resins of this invention, as indicated above. Thus, formaldehyde, acetaldehyde, propionaldehyde, butyraldehyde, valeraldehyde, hexaldehyde, benzaldehyde, crotonaldehyde, heptaldehyde, pelargonic aldehyde, dodecanaldehyde, margaric aldehyde, octadecanaldehyde and the like and mixtures thereof can be employed. In general, polyvinyl acetal resins made from saturated aliphatic aldehydes are preferred. In particular, polyvinyl acetal resins made with saturated lower aliphatic aldehydes containing 8 or less carbon atoms, and especially those made with formaldehyde, acetaldehyde and butyraldehyde and mixtures thereof are preferred.

It has been found that blends containing the crystalline poly-α-olefins of this invention and the polymeric modifiers described, can be melt spun into high strength yarns which yarns can be dyed to deep, light and gas fast shades by means of dispersed and premetallized dyes. The dyeing process can be carried out using conventional procedures either with or without carriers. The polymeric blends can contain from 1% or less to 25% or more, by weight of the polyvinyl acetal modifier, although the preferred concentration of modifier is from 5 to 15%. However, there are special situations which may warrant the use of 30 or perhaps even 40% by weight based on the blend, of certain of the modifiers disclosed. Furthermore, even though as little as 1% by weight based on the blend, of the specified polymeric modifiers will impart dye affinity to the fibers, it is preferred that amounts of at least 5% be employed, particularly where deep shades are desired. Polymeric blends of this type can generally be melt spun at temperatures which are substantially below those which are necessary to melt spin the pure poly-α-olefin.

Blends of crystalline polymers of α-olefins containing 5 to 11 carbon atoms with one or more of the polymeric modifiers can be prepared in any desired manner, whether it be mechanical mixing, coprecipitation or other blending method, e.g., they can be prepared at elevated temperatures on rolls, in a Banbury mixer or any other suitable type of processing equipment or they can be prepared by multiple extrusion techniques. The polymeric modifiers can have a molecular weight of 1000 and higher depending on the particular blend properties desired and the blending method employed. It is to be understood, of course, that any polymeric modifier having a molecular weight in excess of 1000 which is capable of imparting the desired characteristics, as set forth herein, to the poly-α-olefin is within the scope of our invention.

Generally, it is desirable to prepare the modified poly-α-olefin compositions from substantially crystalline polymers, i.e. those having crystallinities in excess of 85 percent and preferably in excess of 90 percent, since the presence of a substantial quantity of noncrystalline portions makes it extremely difficult to melt spin continuous, draftable fibers. In addition, the poly-α-olefin to be employed in the invention will have a high softening point while being melt spinnable at temperatures below about 330° C. In general, these poly-α-olefins are also characterized by molecular weights in excess of 10,000 and preferably within the range of 15,000 to about 25,000. The molecular weight of these polymers is best determined by inherent viscosity determinations in tetralin at 145° C. which, for the polymers of this invention, range from about 0.8 to about 1.8 and preferably from about 0.9 to about 1.4. The monomers containing 5–11 carbon atoms which will form homo- and copolymers meeting these requirements include:

3-methyl-1-butene
4-methyl-1-pentene
Styrene
Allylcyclohexane
Allylcyclopentane
Allylbenzene
4-phenyl-1-butene
3-methyl-1-hexene
4-methyl-1-hexene
3-phenyl-1-butene
4,4-dimethyl-1-hexene
4,4-dimethyl-1-pentene
3-ethyl-1-heptene
3,5-dimethyl-1-hexene
2-vinyl-6,6-dimethylnorpinane
3-cyclohexyl-1-butene
3,5,5-trimethyl-1-hexene
3-vinyl-2,2-dimethylnorcamphane Hence, the polymers employed in the practice of this invention to form high softening dyeable fibers are any of the homo- or interpolymers of the monomers listed above. Other copolymers which can be employed in the practice of the invention can contain monomeric units of the above monomers with about 1 to about 15 mole percent of monomeric units derived from at least one of the following α-olefins:

Propylene
1-butene
1-pentene
1-hexene
1-octene
5-methyl-1-hexene
6-methyl-1-heptene For the most part, these homo- and copolymers have already been described in the prior art and can be prepared by any of the conventional prior art processes employing the well-known stereospecific catalysts. These catalysts contain at least two components, namely, a transition element halide in combination with an activator therefor. These catalysts include, for example, mixtures containing a transition element from the 4th to the 6th subgroups of the periodic table in combination with a metal of group I–A or II or aluminum, or with an alloy of metals of group I–A and/or II and/or aluminum, or with a halide or organometallic compound of a metal of group I–A or II and/or aluminum or with a complex organometallic compound of aluminum and a metal of group I–A or II of the periodic table. If desired, a third component can be employed in order to increase the stereospecificity of the catalyst and reduce the formation of waxes, oils and amorphous polymer. Generally, it is advantageous to employ a third component since polymers having crystallinities in excess of 90 percent can be obtained directly from the reactor without a separate extraction step.

The polymers of 3-ethyl-1-heptene, 3,5-dimethyl-1-hexene, 2-vinyl-6,6-dimethylnorpinane, 3-cyclohexyl-1-butene, 3,5,5-trimethyl-1-hexene, 3-vinyl-2,2-dimethylnorcamphane, allylcyclopentane and allylcyclohexane which are employed in the practice of this invention are not disclosed in the prior art. However, these polymers are disclosed in copending applications to Wicker et al., Ser. No. 48,850, filed August 11, 1960, Wicker et al., Ser. No. 48,-852, filed August 11, 1960, Shearer, Ser. No. 48,851, filed August 11, 1960, Shearer et al., Ser. No. 48,803, filed August 11, 1960, Shearer, Ser. No. 48,841, filed August 11, 1960, and Shearer et al., Ser. No. 724,805, filed March 31, 1958, respectively.

The modified poly-α-olefin compositions described herein can be spun into fibers having the desired characteristics by the conventional spinning procedures, e.g. melt spinning, dry spinning, wet spinning or extrusion through a suitable die. Furthermore, these poly-α-monoolefin compositions can be formed into the various cross-sections, e.g. cloverleaf, Y-section etc., by employing spinnerettes or dies having appropriately shaped orifices.

This invention can be further illustrated by the following examples of preferred embodiments thereof although it will be understood that these examples are included merely for purposes of illustration and are not intended to limit the scope of the invention unless otherwise specifically indicated:

Example 1

A blend containing 90%, by weight, of crystalline poly (3-methyl-1-butene) and 10%, by weight, of poly(vinyl acetaldehyde acetal) was prepared by melt extrusion of the corresponding mechanical mixture. The inherent viscosity of the poly(3-methyl-1-butene) used was 1.4 in tetralin at 145° C. The blend was then melt spun at about 310° C. into 34-filament yarns which were drafted immediately in superheated steam at 180° C. The resulting yarn exhibited the following properties: total denier 178; tenacity 2.47 g./den., elongation 27%, and an elastic modulus of 24 g./den.

Knit tubes prepared from these yarns all dyed to deep shades with C.I. Disperse Yellow 33 and C.I. Disperse Violet 11. All samples showed good fastness to ultraviolet light in a Fade-Ometer for 20 hours.

Example 2

A blend containing 92.5%, by weight, of crystalline poly(4-methyl-1-pentene) having an inherent viscosity of 1.35 and a crystalline melting point of 235° C. (oriented fiber) and 7.5%, by weight, of poly(vinylbutyral) was prepared by melt extrusion. The blend was melt spun at 250° C. into 34-filament yarn which was drawn 8 to 12 times at 170° C. The resulting yarn exhibited the following properties: total denier 53, tenacity 5.93 g./den., elongation 29%, and an elastic modulus of 47 g./den.

Knit tubes prepared from these yarns all dyed to deep shades with disperse dyes such as C.I. Disperse Red 35 and C.I. Disperse Blue 27.

Example 3

A blend containing 95%, by weight, of crystalline poly (allylcyclohexane) having an inherent viscosity of 1.10 in tetralin at 145° C. and a crystalline melting point of 225° C. (oriented fiber) and 5%, by weight, of polyvinyl isobutyraldehyde acetal resin was prepared using a Banbury mixer. This blend was melt spun at 240° C. into 34-filament yarn which was drafted in saturated steam at 20 p.s.i. pressure. The resulting yarn exhibited the following properties: total denier 115, tenacity 5.93 g./den., elongation 37% and an elastic modulus of 47 g./den.

This modified poly(allylcyclohexane) yarn showed excellent affinity for disperse dyes such as C.I. Disperse Red 35 and C.I. Disperse Blue 27.

Example 4

A blend containing 90%, by weight, of crystalline poly (allylclopentane) having an inherent viscosity of 1.52 in tetralin at 145° C. and a crystalline melting point of 225° C. (oriented fiber) and 10%, by weight, of polyvinyl propionaldehyde acetal resin was prepared using a Banbury mixer. This blend was melt spun at 250° C. into 34-filament yarn which was drafted in hot air at 130° C. The resulting yarn exhibited the following properties: total denier 150, tenacity 6.95 g./den., elongation 21% and an elastic modulus of 53 g./den.

This modified poly(allylcyclopentane) yarn showed extremely good affinity for disperse dyes such as C.I. Disperse Red 35 and C.I. Disperse Blue 27.

Example 5

Each of the copolymers of 4,4-dimethyl-1-pentene listed in the following table was blended in a 19 to 1 weight radio with poly(vinylbutyral). The latter contained 88% butyral groups, 2.5% acetate group sand 9.5% hydroxyl groups. Blending was accomplished by means of continuous melt extrusion of mechanical mixtures of the resins. Each blend was melt-spun at 270–300° C. into 34-filament yarn which was given a first stage draft in saturated steam followed by a final drafting in superheated steam. The properties of the yarns obtained are shown below in the table.

| Comonomer | Properties of Modified Yarn | | | | |
|---|---|---|---|---|---|
| | Mole, percent by wgt. | Total Denier | Tenacity G./Den | Elong, percent | Elastic Modulus, G./Den. |
| Propylene | 10 | 170 | 3.80 | 55 | 45 |
| 1-Butene | 10 | 215 | 2.50 | 160 | 20 |
| 1-Pentene | 5 | 55 | 4.90 | 26 | 44 |
| 1-Hexene | 5 | 57 | 4.07 | 34 | 38 |
| 1-Octene | 3 | 200 | 5.30 | 25 | 60 |
| 3-Methyl-1-butene | 12 | 813 | 0.97 | 70 | 15 |
| 4-Methyl-1-pentene | 15 | 195 | 1.73 | 200 | 20 |
| Styrene | 15 | 689 | 1.16 | 211 | 10 |
| Allylcyclohexane | 7 | 250 | 2.85 | 65 | 26 |
| Allylbenzene | 5 | 100 | 4.02 | 35 | 24 |
| 4-Phenyl-1-butene | 5 | 260 | 2.89 | 60 | 28 |

All of the resulting yarns can be readily dyed to deep, light fast shades, particularly with disperse dyes.

Example 6

A blend containing 95%, by weight, of crystalline poly(allylbenzene) having a crystalline melting point of 230° C. in the form of film and 5%, by weight, of polyvinyl acetaldehyde acetal resin was prepared by melt extrusion. This blend was melt spun at 285° C. into 34-filament yarn which was drafted immediately in superheated steam. The resulting yarn exhibited the following properties: total denier 382, tenacity 4.96 g./den., elongation 17% and an elastic modulus of 68 g./den.

Knit tubes prepared from these yarns all dyed to deep shades with C.I. Disperse Violet 11, C.I. Disperse Red 35 and C.I. Disperse Blue 27 in aqueous dye baths at boil for 1 hr. Even deeper shades were obtained when either butyl benzoate or benzyl butyrate was used as a carrier. In contrast, a sample of unmodified poly(allylbenzene) showed virtually no affinity for the aforementioned dyes.

Thus, by means of this invention, substantially crystalline poly-α-olefin yarns and fibers which combine high softening point with improved dye affinity, excellent light and gas fastness, and increased stability are provided to the art. Such fibers can be substituted for the corresponding unmodified poly-α-olefin fiber where dye affinity is of special significance, as for example, in fabrics. In addition, the dye-receptive fibers of this invention can be woven into wool-like blankets or used in the production of automobile seat covers and marine hawsers that are as strong as nylon and somewhat cheaper. A further significant characteristic of the fibers of this invention is their low "creep" which makes them eminently suitable for use in tire cord.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. Polyhydrocarbon fiber exhibiting excellent dye affinity, light and gas fastness and resistance to oxidation and weathering, said polyhydrocarbon being crystalline and a member selected from the group consisting of homopolymers of a monomer selected from the group consisting of 3-methyl-1-butene, 4-methyl-1-pentene, styrene, allylcyclohexane, allylcyclopentane, allylbenzene, 4-phenyl-1-butene, 3-methyl-1-hexene, 4-methyl-1-hexene, 3-phenyl-1-butene, 4,4-dimethyl-1-hexene, 4,4-dimethyl-1-pentene, 3-ethyl-1-heptene, 3,5-dimethyl-1-hexene, 2-vinyl-6,6-dimethyl-norpinane, 3 - cyclohexyl - 1 - butene, 3,5,5-trimethyl-1-hexene, 3-vinyl - 2,2 - dimethylnorcamphane, interpolymers of said monomers with each other and copolymers containing at least 85 mole percent of said monomers with an α-olefin selected from the group consisting of propylene, 1-butene, 1-pentene, 1-hexene, 1-octene, 5-methyl-1-hexene and 6-methyl-1-heptene, said fiber containing about 1 to about 25%, by weight based on the fiber, of a polyvinyl acetal resin.

2. The fiber of claim 1 wherein the polyvinyl acetal resin contains at least 50 mole percent acetal.

3. The fiber of claim 1 wherein the polyvinyl acetal resin contains at least 80 mole percent acetal.

4. The fiber of claim 1 wherein the polyvinyl acetal resin is the polyvinyl acetal of an aldehyde containing 1 to 18 carbon atoms.

5. The fiber of claim 1 wherein the polyvinyl acetal resin is the polyvinyl acetal of an aldehyde containing 1 to 8 carbon atoms.

6. The fiber of claim 1 wherein the polyvinyl acetal resin is polyvinyl formaldehyde acetal.

7. The fiber of claim 1 wherein the polyvinyl acetal resin is polyvinyl acetaldehyde acetal.

8. The fiber of claim 1 wherein the polyvinyl acetal resin is polyvinyl butyraldehyde acetal.

9. The fiber of claim 1 wherein the polyvinyl acetal resin is polyvinyl isobutyraldehyde acetal.

10. The fiber of claim 1 wherein the polyvinyl acetal resin is polyvinyl propionaldehyde acetal.

11. The fiber of claim 1 wherein the monomer is 3-methyl-1-butene.

12. The fiber of claim 1 wherein the monomer is 4-methyl-1-pentene.

13. The fiber of claim 1 wherein the monomer is allylcyclohexane.

14. The fiber of claim 1 wherein the monomer is allylcyclopentane.

15. The fiber of claim 1 wherein the monomer is 4,4-dimethyl-1-pentene.

16. The fiber of claim 1 wherein the monomer is allylbenzene.

17. A composition capable of being spun into fiber exhibiting excellent dye affinity, light and gas fastness and resistance to oxidation and weathering, said composition comprising (A) a crystalline polyhydrocarbon being a member selected from the group consisting of homopolymers of a monomer selected from the group consisting of 3-methyl-1-butene, 4-methyl-1-pentene, styrene, allylcyclohexane, allylcyclopentane, allylbenzene, 4-phenyl-1-butene, 3-methyl-1-hexene, 4-methyl-1-hexene, 3-phenyl-1-butene, 4,4-dimethyl-1-hexene, 4,4-dimethyl-1-pentene, 3-ethyl-1-heptene, 3,5-dimethyl-1-hexene, 2-vinyl-6,6-dimethylnorpinane, 3-cyclohexyl-1-butene, 3,5,5-trimethyl-1-hexene, 3-vinyl-2,2-dimethyl-norcamphane, interpolymers of said monomers with each other and copolymers containing at least 85 mole percent of said monomers with an α-olefin selected from the group consisting of propylene, 1-butene, 1-pentene, 1-hexene, 1-octene, 5-methyl-1-hexene and 6-methyl-1-heptene, and (B) about 1 to about 25%, by weight, based upon the composition of a polyvinyl acetal resin.

18. The composition of claim 17 wherein the polyvinyl acetal resin contains at least 50 mole percent acetal.

19. Polyhydrocarbon fiber containing polyvinyl acetal resin in an effective concentration such that said fiber exhibits excellent dye affinity, light and gas fastness and resistance to oxidation and weathering, said polyhydrocarbon being crystalline and a member selected from the group consisting of homopolymers of a monomer selected from the group consisting of 3-methyl-1-butene, 4-methyl-1-pentene, styrene, allylcyclohexane, allylcyclopentane, allylbenzene, 4-phenyl-1-butene, 3 - methyl - 1 - hexene, 4-methyl-1-hexene, 3-phenyl-1-butene, 4,4-dimethyl-1-hexene, 4,4-dimethyl-1-pentene, 3-ethyl-1-heptene, 3,5-dimethyl-1-hexene, 2-vinyl-6,6-dimethyl-norpinane, 3-cyclohexyl-1-butene, 3,5,5-trimethyl-1-hexene, 3-vinyl-2,2-dimethylnorcamphane, interpolymers of said monomers with each other and copolymers containing at least 85 mole percent of said monomers with an α-olefin selected from the group consisting of propylene, 1-butene, 1-pentene, 1-hexene, 1-octene, 5-methyl-1-hexene, and 6-methyl-1-heptene.

20. Polyhydrocarbon fiber exhibiting excellent dye affinity, light and gas fastness and resistance to oxidation and weathering, said polyhydrocarbon being crystalline and a member selected from the group consisting of homopolymers of a monomer selected from the group consisting of 3-methyl-1-butene, 4-methyl-1-pentene, styrene, allylcyclohexane, allylcyclopentane, allylbenzene, 4-phenyl-1-butene, 3-methyl-1-hexene, 4-methyl-1-hexene, 3-phenyl-1-butene, 4,4-dimethyl-1-hexene, 4,4-dimethyl-1-pentene, 3-ethyl-1-heptene, 3,5-dimethyl-1-hexene, 2-vinyl-6,6-dimethyl-norpinane, 3-cyclohexyl-1-butene, 3,5,5-trimethyl-1-hexene, 3-vinyl-2,2-dimethylnorcamphane, interpolymers of said monomers with each other and copolymers containing at least 85 mole percent of said monomers with an α-olefin selected from the group consisting of propylene, 1-butene, 1-pentene, 1-hexene, 1-octene, 5-methyl-1-hexene and 6-methyl-1-heptene, said fiber containing about 5 to about 15%, by weight based on the fiber, of a polyvinyl acetal resin.

References Cited in the file of this patent
UNITED STATES PATENTS

| | | |
|---|---|---|
| 2,448,666 | Fletcher et al. | Sept. 7, 1949 |
| 2,571,683 | Coover et al. | Oct. 16, 1951 |
| 3,003,845 | Ehlers | Oct. 10, 1961 |

UNITED STATES PATENT OFFICE
CERTIFICATE OF CORRECTION

Patent No. 3,102,869                 September 3, 1963

Harry W. Coover, Jr., et al.

It is hereby certified that error appears in the above numbered patent requiring correction and that the said Letters Patent should read as corrected below.

Column 1, line 34, for "have" read -- having --; column 6, line 12, for "radio" read -- ratio --; line 13, for "2,5% acetate group sand" read -- 2.5% acetate groups and --; same column 6, in the table, last column, line 10 thereof, for "24" read -- 34 --.

Signed and sealed this 11th day of February 1964.

(SEAL)
Attest:

EDWIN L. REYNOLDS

Attesting Officer                     Acting Commissioner of Patents

UNITED STATES PATENT OFFICE
CERTIFICATE OF CORRECTION

Patent No. 3,102,869                          September 3, 1963

Harry W. Coover, Jr., et al.

It is hereby certified that error appears in the above numbered patent requiring correction and that the said Letters Patent should read as corrected below.

Column 1, line 34, for "have" read -- having --; column 6, line 12, for "radio" read -- ratio --; line 13, for "2,5% acetate group sand" read -- 2.5% acetate groups and --; same column 6, in the table, last column, line 10 thereof, for "24" read -- 34 --.

Signed and sealed this 11th day of February 1964.

(SEAL)
Attest:

EDWIN L. REYNOLDS

Attesting Officer                      Acting Commissioner of Patents